Dec. 13, 1960 N. BERMAN 2,964,716
DISPLACEMENT-TO-FREQUENCY TRANSDUCER
Filed July 29, 1957 3 Sheets-Sheet 1
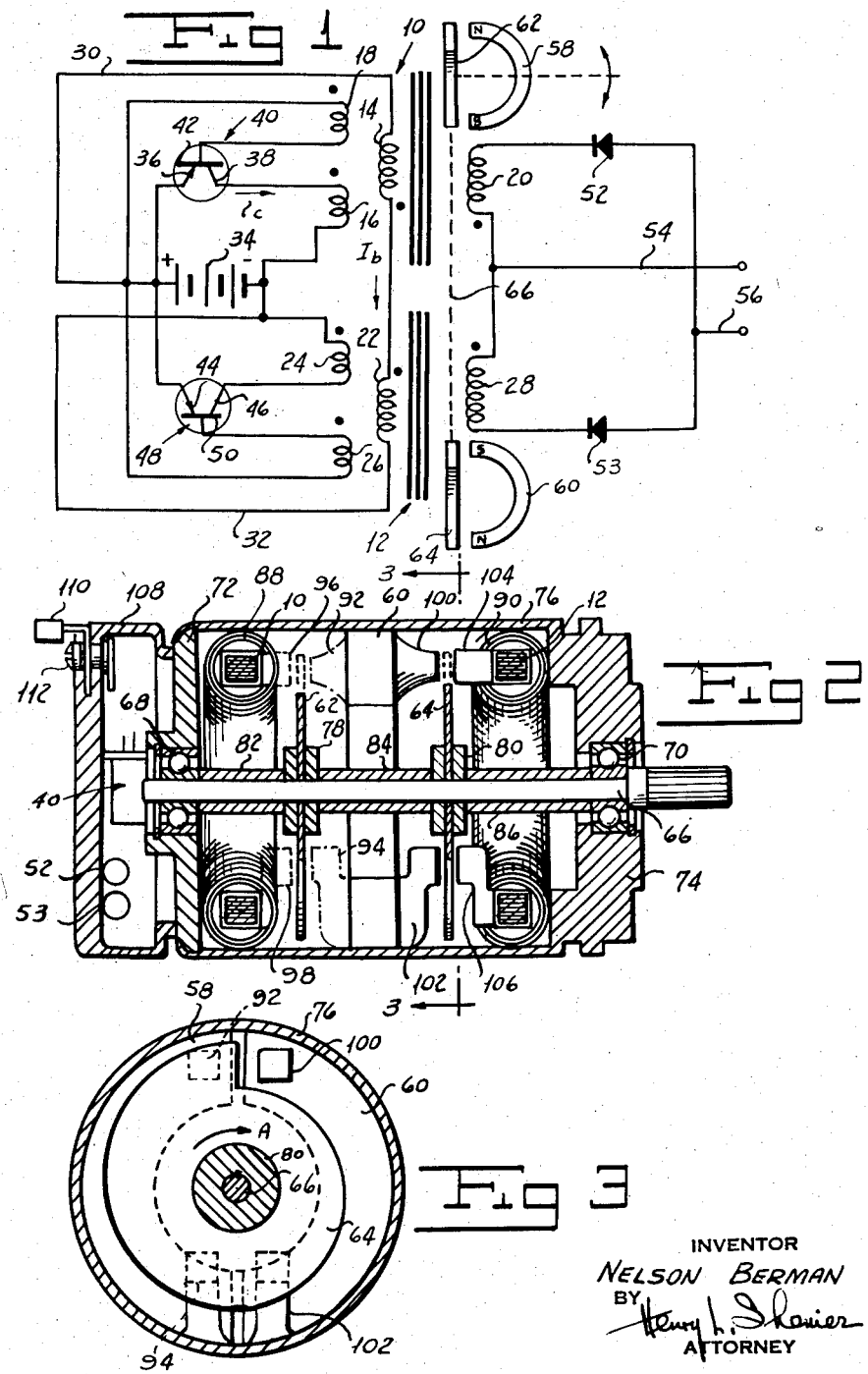
INVENTOR
NELSON BERMAN
BY
ATTORNEY

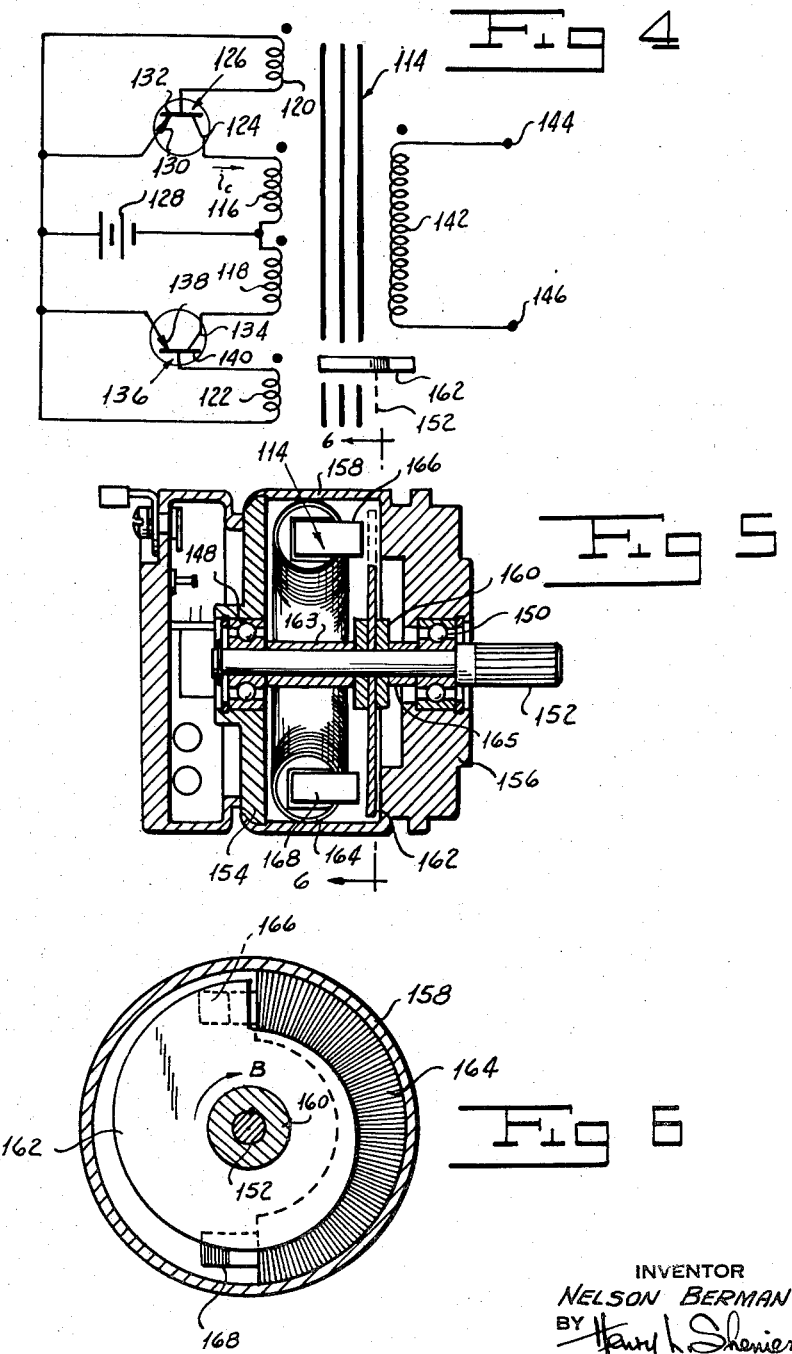

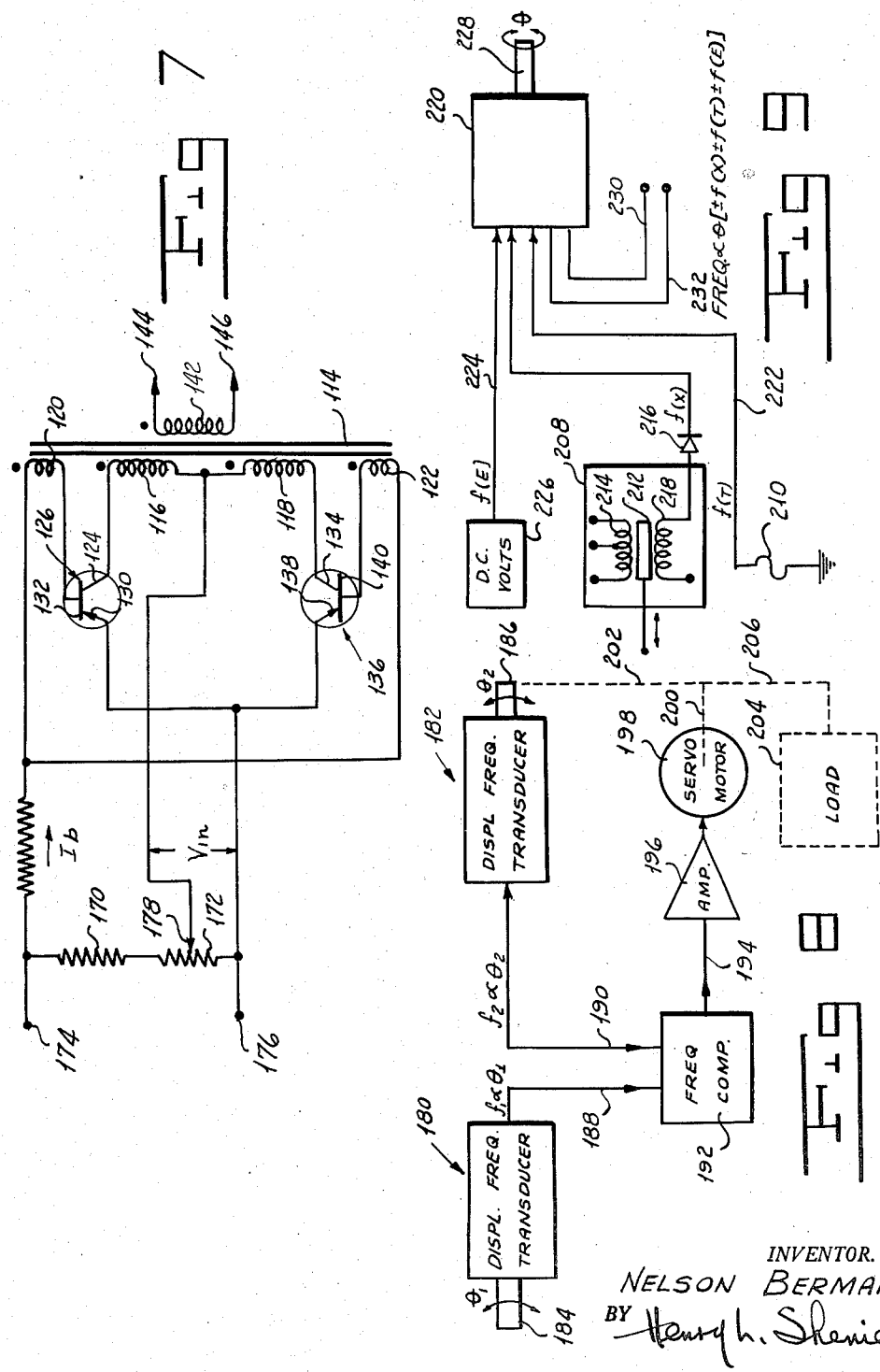

United States Patent Office 2,964,716
Patented Dec. 13, 1960

1

2,964,716

DISPLACEMENT-TO-FREQUENCY TRANSDUCER

Nelson Berman, New Hyde Park, N.Y., assignor, by mesne assignments, to United Aircraft Corporation, East Hartford, Conn., a corporation of Delaware Filed July 29, 1957, Ser. No. 674,788

3 Claims. (Cl. 331—113)

My invention relates to a displacement-to-frequency transducer and more particularly to a displacement-to-frequency transducer for use with a computer or the like requiring an input signal, the frequency of which varies with the physical quantity being fed to the computer.

Some computers to which information is to be fed require an input signal, the frequency of which varies in accordance with the quantity to be fed into the computer. I have invented a displacement-to-frequency transducer which produces an output signal, the frequency of which is proportional to the displacement of a data input member from an arbitrary reference point. My transducer has many advantages over data transmitters of the prior art. First, it is compatible with a computer requiring an input signal representing input data as a frequency. My transducer is very reliable since it uses no brushes which require frequent adjustment and replacement. The only moving parts in my transducer are the data input shaft and a magnetic member carried by the shaft. Owing to the absence of brushes or rubbing contacts, only a low driving torque is required. Since information produced by my transducer is numerically represented as a frequency, it may be transmitted without being degraded. The output signal from my transducer requires only a single channel including a pair of conductors for transmitting data to a remote location. Loading of my transducer introduces no errors into the data representation. When used as a receiver in a data transmission system, my transducer is capable of transmitting its representation to another device or to a computer while providing the required feedback signal in a servo-loop. The output signal of my transducer may readily be fed through conductors and through radio telemetering links.

One object of my invention is to provide a displacement-to-frequency transducer which produces an output signal, the frequency of which is a function of the displacement of a data input member from an arbitrary reference point.

Another object of my invention is to provide a displacement-to-frequency transducer which produces an output representation into which no error is introduced by loading of the transducer.

A further object of my invention is to provide a displacement-to-frequency transducer which uses no brushes.

Still another object of my invention is to provide a displacement-to-frequency transducer which requires only a low driving torque.

Other and further objects will appear from the following description:

In general my invention contemplates the provision of a displacement-to-frequency transducer including a saturable core and a primary winding carried by the core. A transistor or the like which acts as a switch is adapted to connect a direct current potential to the primary winding to produce a flux in the saturable core. I provide feedback means responsive to flux change in the core for determining the period of conduction of the transistor. The arrangement of the circuit is such that the feedback signal generated by the core flux disappears when the core saturates to render the transistor or the like nonconductive to disconnect the potential from the primary winding. An output winding carried by the core produces an output signal, the frequency of which is determined by the point at which the core saturates.

In one form of my invention, I provide an auxiliary magnet and an associated displaceable magnetic shunt which determines the point at which the core saturates. In a second form of my invention, I provide the core with an air gap and a displaceable magnetic member adapted to be moved to alter the reluctance of the flux path in accordance with displacement. In both forms of my invention, the secondary winding output signal has a frequency which is a function of the displacement of an input member from an arbitrary reference point.

In the accompanying drawings which form part of the instant specification and which are to be read in conjunction therewith, like reference numerals are used to indicate like parts in the various views:

Figure 1 is a schematic view of one form of my displacement-to-frequency transducer.

Figure 2 is a sectional view of the form of my displacement-to-frequency transducer represented schematically in Figure 1.

Figure 3 is a sectional view of the form of my displacement-to-frequency transducer shown in Figure 2 taken along the line 3—3 of Figure 2.

Figure 4 is a schematic view of a second form of my displacement-to-frequency transducer.

Figure 5 is a sectional view of the form of my displacement-to-frequency transducer represented schematically in Figure 4.

Figure 6 is a sectional view of the form of my displacement-to-frequency transducer shown in Figure 5, taken along the line 6—6 of Figure 5.

Figure 7 is a schematic view of a form of my displacement-to-frequency transducer which compensates for variations in line voltage.

Figure 8 is a block diagram of my displacement-to-frequency transducer in use with a computer-driven servomotor.

Figure 9 is a block diagram of my displacement-to-frequency transducer in use with various other forms of transducers in which various physical quantities first are added and then are multiplied by the shaft angle of my transducer.

More particularly referring now to Figure 1 of the drawings, one form of my displacement-to-frequency transducer includes respective cores indicated generally by the reference charactres 10 and 12. Core 10 carries a control or bias winding 14, a primary winding 16, a feedback winding 18, and a secondary or output winding 20. Core 12 carries a control or bias winding 22, a primary winding 24, a feedback winding 26, and a secondary or output winding 28. The respective normal polarities of the windings are as indicated in the figure.

Respective conductors 30 and 32 connect control windings 14 and 22 in series with a source of direct current potential such as a battery 34. As a result of this connection, a constant control or bias current $I_b$ flows through windings 14 and 22. I connect the emitter 36 of a first transistor, indicated generally by the reference character 40, to the positive terminal of battery 34. The collector 38 of transistor 40 is connected to the negative terminal of battery 34 through winding 16. I connect the feedback winding 18 between the base 42 of transistor 40 and the positive terminal of battery 34.

I connect the emitter 44 of a second transistor, indicated generally by the reference character 48, to the positive terminal of battery 34. The collector 46 of the transistor 48 is connected to the negative terminal of battery 34 through winding 24. I connect feedback winding 26 between the base 50 of transistor 48 and the positive terminal of battery 34.

I connect output windings 20 and 28 in a series circuit with a pair of unidirectional conducting devices such as crystals or diodes 52 and 53. Respective output conductors 54 and 56 connected respectively to the common terminal of windings 20 and 28 and to the common terminal of diodes 52 and 53 afford a means for removing the output signal from my transducer.

As is known in the art, the nature of the p-n-p transistors 40 and 48 is such that collector current flows when the base is negative with respect to the emitter. Stated otherwise, collector current will not flow if the base is positive with respect to the emitter. In the circuit shown in Figure 1 let us assume that the base becomes negative with respect to the emitter 36 owing to voltage induced in the winding 18. When this occurs current $i_c$ begins to flow in the emitter-to-collector circuit of transistor 40 through primary winding 16. In this condition of its operation the transistor 40 offers small resistance so that in fact the battery 34 is connected substantially directly across winding 16. Owing to the current flow through winding 16, a flux builds up in core 10. As the flux builds up, it induces a feedback potential in winding 18 of a polarity to render base 42 still more negative with respect to emitter 36 and collector 38. As long as this flux build-up continues, a feedback voltage is induced in winding 18 which tends to maintain the emitter-to-collector circuit of transistor 40 conductive. This flux build-up continues until core 10 saturates. Preferably I form the core 10 of a material having a hysteresis loop with a very sharp knee with the result that the saturation point of the core is very well defined. When saturation is reached, the flux in core 10 is constant and a feedback signal no longer is induced in winding 18. The loss of this feedback potential causes transistor 40 to be rendered nonconductive with the result that the current $i_c$ falls to zero. During the period of buildup of flux in core 10, an output voltage is induced in winding 20. At saturation, this output voltage drops to zero.

During the buildup of flux in the core 10, a potential of the polarity indicated is induced in winding 14. This potential produces a voltage across winding 22, which voltage induces a potential in winding 26 of a polarity to render base 50 positive with respect to the emitter 44 of transistor 48. In this condition of operation of transistor 48, it is cut off. When the induced voltage in winding 14 drops to zero as core 10 saturates current $I_b$ returns to its former value. When this occurs, the resulting change in flux, owing to the change in current in winding 22, on the core 12 induces a voltage in winding 26 of a polarity to render base 50 slightly negative with respect to emitter 44 to initiate conduction through transistor 48. Owing to the action of feedback winding 26, transistor 48 is maintained conductive until core 12 is saturated at which time conduction shitfs to transistor 40. It is to be understood that during the period of conduction of transistor 48 the polarities of the induced voltages of the windings shown in Figure 1 are opposite to the polarities indicated in the figure. The polarity of the output voltage across conductors 54 and 56 during the period of conduction of transistor 48 is opposite to the polarity of the output voltage during the period of conduction of transistor 40. When transistor 48 conducts, a voltage is produced in winding 14 which induces a voltage in winding 18 to render transistor 40 nonconductive.

It will be seen that my system produces an output signal having a substantially rectangular form and a frequency which is determined by the point at which cores 10 and 12 alternately saturate. From the circuit as thus far described, it will be seen that the saturation point of the cores is a function of the applied voltage of battery 34, of the reset point of the circuit, which is determined by bias current $I_b$, and of the physical characteristics of the cores 10 and 12.

I provide means responsive to the position of a data input member for varying the times which the respective cores 10 and 12 saturate to vary the frequency of the output signal. In the form of my invention shown in Figure 1, I dispose respective permanent magnets 58 and 60 adjacent the cores 10 and 12. These magnets 58 and 60 produce biasing fluxes which change the points at which cores 10 and 12 saturate. In order to vary the biasing flux passing through the cores in accordance with the position of a shaft or the like, I mount a pair of respective magnetic shunts 62 and 64 on a common shaft, indicated schematically in Figure 1 by the reference character 66, for rotation with the shaft. Owing to the shape of these shunts, as shaft 66 turns, the biasing fluxes from the magnets 58 and 60 passing through the cores 10 and 12 change in accordance with shaft position. As the biasing fluxes vary, the points at which cores 10 and 12 saturate change with the result that the frequency of the output signal on conductors 54 and 56 is proportional to the position of shaft 66. With shunts 62 and 64 in a position where the minimum amount of flux is shunted away from the cores 10 and 12, the cores will saturate sooner with the result that the output frequency will be highest. With the shunts 62 and 64 in a position where the maximum amount of flux is shunted away from cores 10 and 12, the output frequency will be at its lowest value.

Referring now to Figure 2, I have shown a physical embodiment of my transducer in which respective bearings 68 and 70 rotatably support shaft 66 in bearing support plates 72 and 74 carried by the transducer housing 76. Respective hubs 78 and 80 fixed on shaft 66 for rotation with the shaft carry the respective shunts 62 and 64. Spacer bushings 82, 84, and 86 maintain hubs 78 and 80 in their proper axial positions on shaft 66. Each of the respective cores 10 and 12 is formed of any suitable material such as wound Permalloy tape or the like. Cores 10 and 12 carry respective toroidal windings 88 and 90 which make up the respective control, feedback, primary and secondary windings on the cores 10 and 12.

I mount the respective permanent magnets 58 and 60 substantially centrally within housing 76 between shunts 62 and 64. The cores 10 and 12 and their associated windings are located within the housing outboard of the respective shunts 62 and 64. As is indicated in phantom in Figure 2, I form magnet 58 with respective poles 92 and 94 which cooperate with extensions 96 and 98 formed on core 10 to provide a flux path for the biasing flux from the magnet 58. I form magnet 60 with respective poles 100 and 102 which cooperate with projections 104 and 106 formed on core 12 to provide a path for the biasing flux from magnet 60.

Referring now to Figure 3, it can be seen that the shape of each of the shunts 62 and 64 is such that as shaft 66 rotates in the direction of the arrow A in the figure, for example, more and more of the flux passing between poles 100 and 102 will be shunted by shunt 64 away from the path through core 12 provided by projections 104 and 106. The action of shunt 62 is similar to that of shunt 64. The result is that as shaft 66 moves shunts 64 and 62 from the position of shunt 64 shown in Figure 3, the frequency of the output signal on conductors 54 and 56 decreases. It is to be understood that the configuration of the shunts 62 and 64 may be such as will make the output frequency any desired function of shaft position. It will be appreciated, of course, that the maximum variation in frequency provided occurs during approximately one revolution of shaft 66.

The remaining circuitry of the form of my transducer shown in Figure 1 is housed in an enclosure 108 fixed by any convenient means on end bearing plate 72 of housing 76. Enclosure 108 houses transistors 40 and 48 as well as crystals or diodes 52 and 53. Conducting lugs or the like 110 fixed on enclosure 108 by screws or the like 112 provide means for making electrical connections to an external circuit.

Referring now to Figure 4, an alternate form of my transducer includes a core, indicated generally by the reference character 114, which carries respective primary windings 116 and 118 and respective feedback windings 120 and 122. I connect winding 116 between the collector 124 of a transistor, indicated generally by the reference character 126, and the negative terminal of a battery 128. I connect the emitter 130 of transistor 126 to the positive terminal of battery 128. The feedback winding 120 is connected between the base 132 of transistor 126 and the emitter 130.

I connect primary winding 118 between the collector 134 of a transistor indicated generally by the reference character 136 and the negative terminal of battery 128. I connect the emitter 138 of transistor 136 to the positive battery terminal. Feedback winding 122 is connected between the base 140 of transistor 136 and emitter 138. Core 114 also carries an output winding 142 connected to respective output terminals 144 and 146.

In the circuit of Figure 4, let us assume that base 132 is negative with respect to emitter 130 so that transistor 126 conducts a collector current $i_c$. In this condition of operation of the transistor it effectively connects battery 128 directly across winding 116. Owing to the flow of current $i_c$ through winding 116, a flux builds up in core 114. As this flux builds up, a feedback potential of a polarity to render base 132 more negative is induced in winding 120. Conduction through transistor 126 continues while the flux in core 114 builds up to saturation. When the core saturates, the flux through the core is constant and the feedback voltage drops to zero. Owing to the loss of this feedback potential, transistor 126 stops conducting and current $i_c$ drops to zero. During the buildup of flux within the core 114, an output potential of a given polarity indicated in Figure 4 is induced in winding 142. When the core saturates, this induced voltage drops to zero.

During the period of conduction of transistor 126, as the flux builds up in core 114, a potential of the polarity indicated in Figure 4 is induced in winding 122. The polarity of this potential renders base 140 positive with respect to the emitter 138 and collector 134 to maintain transistor 136 cut off. When the transistor 126 cuts off, the core flux falls back slightly to its retentive value. This flux change induces voltage of opposite polarity in the windings to render base 140 slightly negative with respect to emitter 138 to initiate conduction through transistor 136. Under the action of transistor 136, the flux through core 114 decreases until the core saturates in the opposite direction, at which time conduction shifts back to transistor 126. During the conduction of transistor 136 a voltage is induced in output winding 142, the polarity of which voltage is opposite to that of the voltage induced in the winding during the period of conduction of transistor 126.

It will be seen that the form of my transducer shown in Figure 4 produces an output voltage having a substantially square shape, the frequency of which is proportional to the potential of battery 128, inversely proportional to the number of turns in the respective feedback windings 120 and 122, and inversely proportional to the saturation flux of the core.

In the form of my invention shown in Figures 4 to 6, I do not employ biasing flux from permanent magnets to alter the output frequency of my transducer. In this form of my invention, I provide the core 114 with a large air gap and move a magnetic member through the gap to vary the reluctance of the flux path provided by the core 114.

In Figures 5 and 6, I have shown one physical embodiment of the form of my invention illustrated schematically in Figure 4. Respective bearings 148 and 150 rotatably mount an input shaft 152 in end bearing plates 154 and 156 of a housing 158. A hub 160, carried by shaft 152 for rotation with it, supports a member 162 formed of magnetic material such as soft iron or the like. Spacers 163 and 165 position hub 160 on shaft 152. I dispose core 114 within housing 158 at one side of member 162. Core 114 is a half ring carrying a hemitoroidal winding 64 making up the windings 116, 118, 120, 122, and 142 of my transducer. A pair of projections 166 and 168 formed on core 114 direct the core flux in a path through the plate or member 162. As can be seen by reference to Figure 6, the configuration of member 162 is such that as shaft 152 rotates, the amount of iron in the air gap between projections 162 and 164 varies. I have shown a form of member 162 such that, as shaft 152 rotates, in the direction of arrow B in Figure 6, for example, member 162 is driven from the position shown gradually to decrease the amount of iron in the gap. It is to be understood that the greater the amount of iron in the gap, the lower will be the output frequency in this form of my invention. Conversely, the less iron in the gap, the greater the output frequency. It will be appreciated that the maximum possible variation in frequency occurs during a half revolution of shaft 152.

Referring now to Figure 7, I have shown an arrangement of the form of my transducer shown in Figures 4 to 6 which is compensated for changes in line voltage. A voltage divider including resistors 170 and 172 is connected in series between the terminals 174 and 176 of a source of direct current potential. A tap 178 associated with resistor 172 divides the source potential into an input voltage $V_{in}$ and a voltage which produces a biasing current $I_b$. As the source of line voltage between terminals 174 and 176 increases, both bias current $I_b$ and the applied voltage $V_{in}$ increase. The effect of the bias current, which acts against the feedback signal of the system, is to cause the output frequency to decrease. As will be apparent from the above, the effect of an increase in $V_{in}$ is to increase the output frequency. Since the effects of $I_b$ and $V_{in}$ in response to a change in line voltage are opposite, tap 178 can be set in a position such that a change in line voltage has negligible effect on the frequency of the output signal.

Referring now to Figure 8, I have shown a pair of my transducers, indicated generally respectively by the reference characters 180 and 182 in use with a frequency responsive data transmission system which is analogous to a synchronous transmitter and synchronous control transformer system. In response to respective rotations $\theta_1$ and $\theta_2$ of their input shafts 184 and 186, transducers 180 and 182 produce respective output signals having frequencies proportional to the shaft displacements. Respective channels 188 and 190 conduct these signals to a frequency comparator 192 which compares the frequencies to produce an output signal which varies in accordance with the frequency difference. A channel 194 conducts the signal from comparator 192 to an amplifier 196 which feeds the amplified signal to a servomotor 198. Motor 198 includes a drive shaft 200 which drives the data shaft 186 of transducer 182 through an appropriate mechanical linkage 202. Shaft 200 may also drive a load 204 through a linkage 206.

Referring now to Figure 9, I have shown my transducer in use with a number of other transducers such as a linear position transducer 208 and a temperature transducer such as a thermocouple 210. Transducer 208 produces an output signal which is proportional to the position of a magnetic member 212 with respect to the center of a center tapped winding 214 supplied with alternating current from a source (not shown). A crystal or diode 216 connects the output winding 218 of transducer 208 to my displacement-to-frequency transducer 220. A channel 222 connects thermocouple 210 to the transducer 220. A channel 224 connects a source 226 of direct current potential to my transducer 220. The respective voltages produced by transducer 208, transducer 210, and source 226 are electrically added to provide the input signal for my transducer 220. In response to an angular movement of the input shaft 228 of my transducer 220, an output signal is produced on the output conductors 230 and 232. The signal on these conductors has a frequency which is proportional to the sum of the signals from source 226, transducer 208, and transducer 210 multiplied by the angular displacement of shaft 228.

It is to be understood that while I have shown and described my transducer as producing a signal, the frequency of which varies with angular shaft position, I may arrange my transducer to produce a signal, the frequency of which varies in accordance with a linear displacement. Further, while I have shown several specific applications of my transducer, it is to be understood that it may be employed in any installation requiring an output signal, the frequency of which is proportional to the displacement of a movable member from an arbitrary reference point.

In operation of the form of my invention shown in Figures 1 to 3, assuming transistor 40 to be conducting, the current $i_c$ in winding 16 induces voltages of the polarity shown in windings 14 and 18. The feedback potential in winding 18 tends to sustain conduction through the transistor. The current flowing through winding 14 also flows through winding 22 and induces a voltage in winding 26 to maintain transducer 48 nonconducting. Conduction through transistor 40 continues until core 10 saturates, at which time the feedback voltage in winding 18 drops to zero to cut off transistor 40. At the same time, a potential is induced in winding 26 as the change in voltage in winding 22 drops to zero to initiate conduction through transistor 48. Conduction switches back and forth between transistors 40 and 48 as cores 10 and 12 alternately saturate. As a result of this operation, output windings 20 and 28 produce an output signal on conductors 54 and 56, which signal has a frequency determined by the time at which the cores saturate. Shunts 62 and 64 vary the biasing fluxes provided by magnets 58 and 60 to vary the frequency of the output signal in accordance with the angular position of shaft 66.

In operation of the form of my invention shown in Figures 4 to 6, assuming transistor 126 to be conducting, the current $i_c$ produces a flux in core 114 which induces voltages of the polarities shown in windings 120, 118, and 122. The voltage induced in winding 120 is of a polarity which sustains conduction through transistor 126 while the voltage induced in winding 122 is of a polarity which maintains transistor 136 cut off. When core 114 saturates in one direction, conduction shifts from transistor 126 to transistor 136. When core 114 saturates in the opposite direction, conduction shifts back from transistor 136 to transistor 126. As a result of this operation, an output signal having a frequency determined by the point at which core 114 saturates is produced in output winding 142. Magnetic member 162 is driven by shaft 152 to vary the reluctance of the flux path through core 114 in accordance with shaft position to change the frequency of the output signal in accordance with changes in shaft position.

The circuit of Figure 7 compensates for changes in applied voltage in the manner described hereinabove. In the system of Figure 8, comparator 192 develops an output signal proportional to the difference in position between shafts 184 and 186. Servomotor 198 which is responsive to this signal drives shaft 186 to a position corresponding to the position of shaft 184. Figure 9 shows an arrangement of my transducer for producing an output signal which is proportional to the sum of various input signals multiplied by shaft displacement.

It will be seen that I have accomplished the objects of my invention. I have provided a displacement-to-frequency transducer which produces an output signal, the frequency of which is proportional to the displacement of a movable member with respect to an arbitrary reference point. My transducer is compatible with computers requiring such an input. My transducer is extremely reliable since it includes no brushes and employs a small number of moving parts. The driving torque required in my transducer is small since the friction and inertia of the moving parts is small. Electrical loading of the transducer by a computer does not introduce errors into the representation provided. The output signal of my transducer is not degraded during transmission.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A displacement-to-frequency transducer including in combination a saturable core forming a flux path, a first winding carried by said core, a source of potential, means for applying said potential across said winding to produce a flux in said core, means responsive to changes in said flux for producing a feed-back signal, means for applying said feed-back signal to said potential applying means, means responsive to changes in said flux for producing an output signal, a source of substantially constant magnetomotive force coupling said core and means including a movable member formed of magnetic material for varying the coupling of said magnetomotive force source with said core to vary the frequency of said output signal.

2. A displacement-to-frequency transducer including in combination a saturable core forming a flux path, a first winding carried by said core, a source of potential, means for applying said potential across said winding to produce a flux in said core, means responsive to changes in said flux for producing a feed-back signal, means for applying said feed-back signal to said potential applying means, means responsive to changes in said flux for producing an output signal, a permanent magnet producing a flux, means mounting said magnet in a position at which its flux normally couples said core, a member formed of magnetic material, means mounting said member adjacent said core for displacement with respect to a reference position and means including said magnetic member for varying the amount of said permanent magnet flux which couples said core to vary the saturation point of the core to vary the frequency of said output signal as a function of the displacement of said member with respect to said reference position.

3. A displacement-to-frequency transducer including in combination respective saturable cores forming flux paths, respective first windings carried by said cores, a source of potential, respective means for applying said potential across said first windings to produce fluxes in the respective cores, respective feed-back means responsive to changes in flux in the associated cores for producing feed-back signals, respective means for applying said feed-back signals to said potential applying means, coupling means responsive to a change in flux in one of said cores for producing a signal in the feed-back means associated with the other of said cores, means responsive to changes in flux through said cores to produce an output signal, respective permanent magnets adapted to produce fluxes, means mounting said magnets in positions at which their fluxes couple the respective cores, respective members formed of magnetic material associated with said permanent magnets, means mounting said magnetic members adjacent said magnets for displacement from a reference position and means including said magnetic members for varying the permanent magnet flux coupling said cores to vary the saturation points of said cores to vary the frequency of said output signal as a function of the displacement of said members from said reference position.

References Cited in the file of this patent

UNITED STATES PATENTS

| | | |
|---|---|---|
| 2,329,021 | Walsh | Sept. 7, 1943 |
| 2,407,536 | Chapman | Sept. 10, 1946 |
| 2,480,265 | Rubenstein | Aug. 30, 1949 |
| 2,813,976 | Uchrin et al. | Nov. 19, 1957 |
| 2,819,352 | Houck | Jan. 7, 1958 |
| 2,854,580 | Uchrin et al. | Sept. 30, 1958 |